April 6, 1937.   J. M. DAYTON   2,075,930
INDICATING DEVICE WITH BACKLASH ELIMINATOR
Filed Aug. 3, 1932   3 Sheets-Sheet 1

Inventor:
James M. Dayton,
by
Atty's.

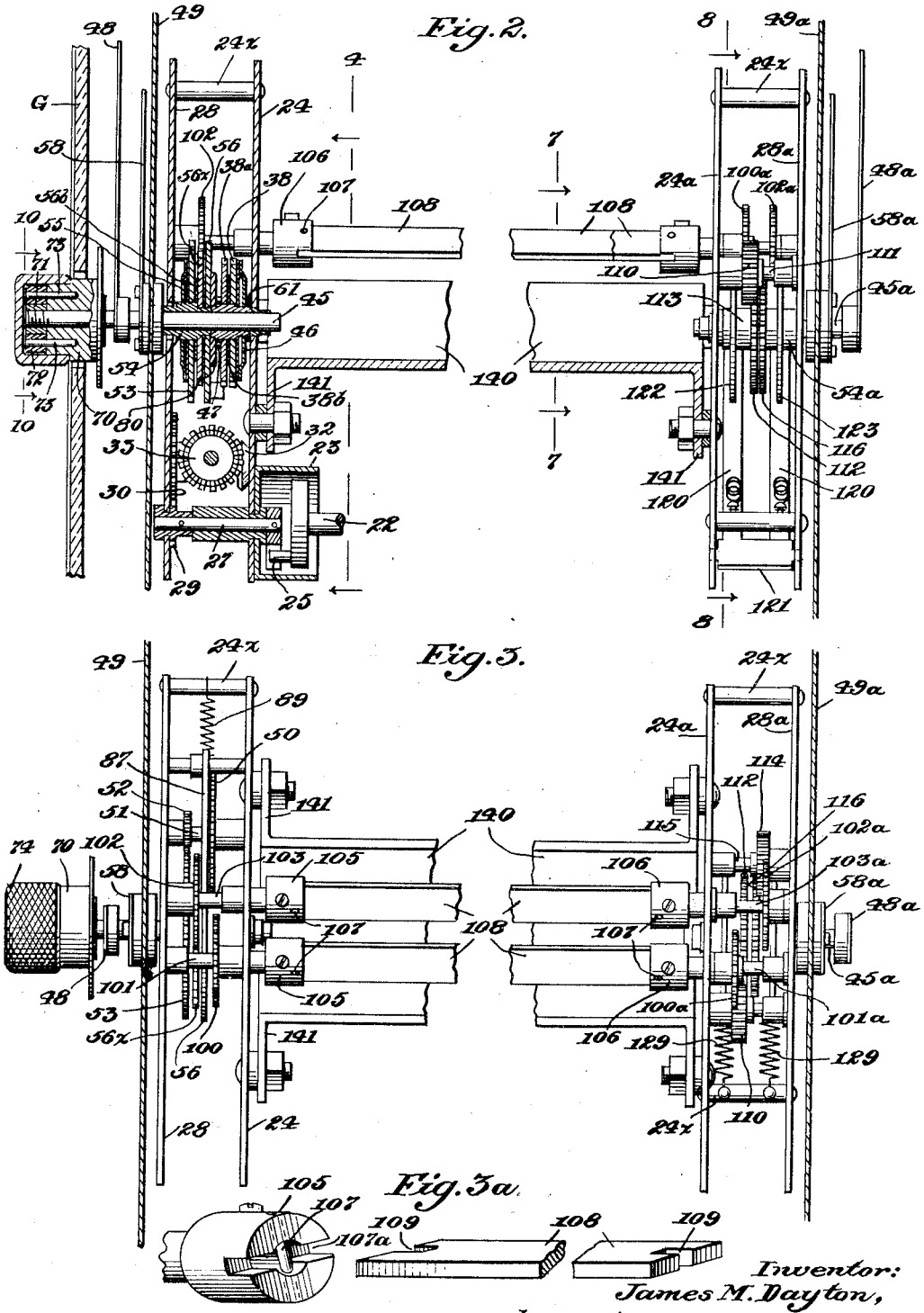

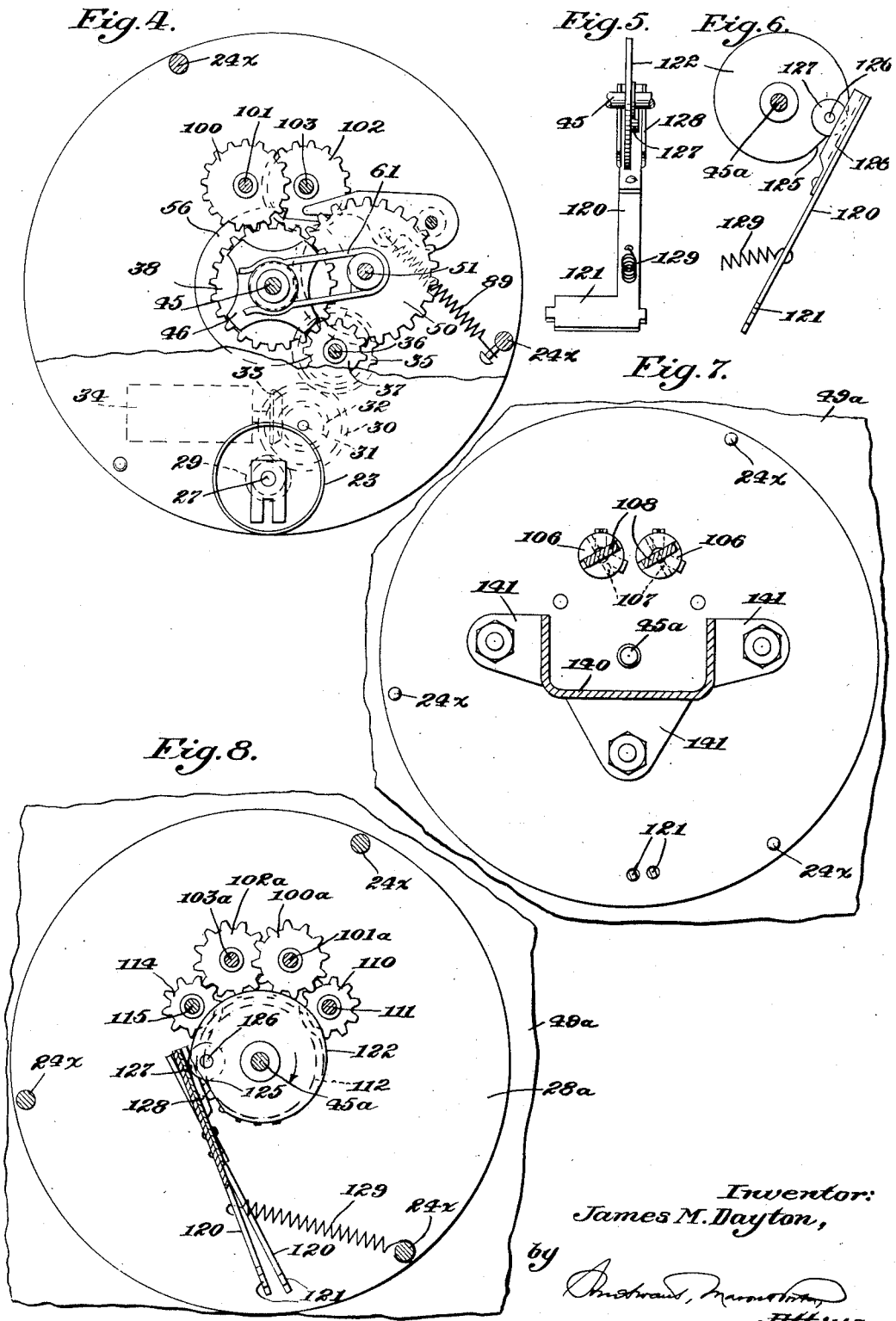

Patented Apr. 6, 1937

2,075,930

UNITED STATES PATENT OFFICE 2,075,930

INDICATING DEVICE WITH BACKLASH ELIMINATOR

James M. Dayton, Torrington, Conn.

Application August 3, 1932, Serial No. 627,392

5 Claims. (Cl. 235—144)

This invention relates to improvements in indicating devices, and more particularly relates to an incorporated apparatus for eliminating backlash in the driving system, so that the indicator member is always started without backlash from its initial position, regardless of movements in the direction opposite from that of indication which may have been accomplished for resetting.

One of the features of the present invention is, therefore, the provision of means to eliminate such backlash prior to the beginning of an indicating operation.

Another feature of the present invention is the provision of means for restoring the indicator to a condition in which backlash has been eliminated, as the indicator approaches a zero initial position.

Another feature of the invention is the employment of two indicating devices of which a master device is driven by the apparatus whose movements are to be indicated and an auxiliary or "dummy" device is to be driven in unison with the master device through a connecting system having a lost motion leading to a possible backlash or discordance of the reading of the two indicators, together with means for eliminating the effects of such backlash during indicating movement.

Another feature of the present invention relates to the provision of two indicators comprising a master and a "dummy" indicator connected positively together for simultaneous movement, particularly in which the indicators are mounted back-to-back so that they may be viewed from opposite directions.

Still another feature of the present invention is the provision of devices in conjunction with a master and an interconnected dummy indicator whereby the dummy indicator is moved for indication and resetting through its interconnection, and is moved faster than determined by its interconnection with the master indicator as the indicator approaches a zero initial position, together with means whereby the dummy indicator is brought to and stopped at its zero position by the operation of the same stop as that which limits the resetting movement of the master indicator.

With these and other objects in view, as will appear in the course of the following specification and claims, an illustrative form of the mechanism is shown on the accompanying drawings, in which:

Figure 2 is a veritcal axial sectional view substantially on line 2—2 of Figure 1, showing the master indicator in section and the dummy indicator in elevation.

Figure 3 is a corresponding top plan view.

Figure 3a is a perspective view on a larger scale of an interconnecting shaft and a coupling head.

Figure 4 is a sectional view substantially on line 4—4 of Figure 2, but with parts removed for clearness, and a part of the rear plate broken away to show the gear connections.

Figure 5 is an elevation of one backlash eliminating structure.

Figure 6 is an end view of the same.

Figure 7 is a sectional view substantially on line 7—7 of Figure 2, showing the relationship of the connecting strap and the interconnecting shafts.

Figure 8 is a sectional view substantially on line 8—8 of Figure 2.

Figure 1:
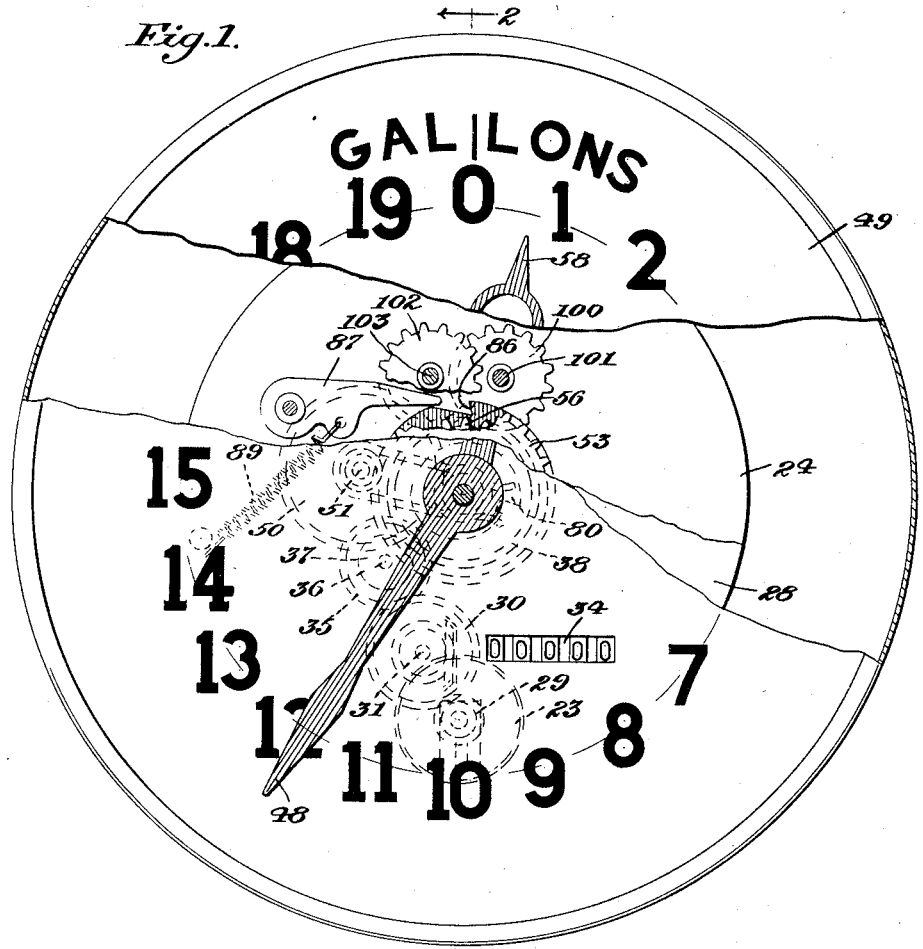
Figure 1 is a face view with parts broken away, of the master indicator, showing means for interconnecting it with the dummy indicator.

In these drawings, the device is shown as applied to an indicating apparatus for the dispensing of liquids, such as gasoline, and as shown in detail with respect to a single indicator in my copending application Serial No. 614,013, filed May 27, 1932. In the present device a master and a dummy indicator are employed which are connected together for movement in unison, and each of which includes two indicator hands moving at different rates of speed in cooperation with a fixed dial, although obviously the invention may be employed in many other manners.

In these drawings, the master dial 49 has indications thereon reading in numerals from zero back to zero for a complete revolution of the slow hand 58, so that a full revolution of the master slow hand 58 registers a dispensing operation of twenty gallons. The master fast hand 48 makes one revolution for each gallon. As shown in Figures 1, 2, 3 and 4, and in my aforesaid copending application, the master indicator (at the left in Figures 1 and 2) includes a front plate 28 and a rear plate 24 which are held at a suitable spacing by post members 24x. A spindle 45 is fixedly connected to the fast hand 48 and is journaled for rotation in a bushing of the rear plate 24.

The device whose movements are to be indicated is connected to a shaft 22 having an eccentric pin 25 within a protective housing 23 and operating to rotate a primary shaft 27 of the master indicator, which is provided with a gear 29 in mesh with a gear 30 which is mounted on a shaft 31 and in turn (Figures 1 and 4) is in driving relationship with a gear 35 on a shaft 36 having a gear 37 in mesh with a gear 38 which is loosely mounted on a sleeve surrounding the spindle 45, to which sleeve is connected the cam plate 80. Resilient friction clutch members 46 force the gear 38 axially on this sleeve into frictional contact with a second gear 38a which is fixed to this sleeve and thus to the spindle 45, so that the master fast hand 48 is driven as shaft 22 moves, through the frictional engagement between gears 38 and 38a. A spacing friction washer 38b may be interposed. A small gear 47 is likewise fixed to gear 38a and is in meshing relationship with a gear 50 on a shaft 51 (Figure 3) having a small gear 52 in mesh with a gear 53 which is loosely mounted on a bushing 54 which loosely surrounds the spindle 45. Gear 56x and a cam 56 are fixed to the bushing 54, which extends through the master dial 49 and is connected to the master slow hand 58 at its outer end. A second resilient pressure member 55 forces gear 53 toward frictional engagement with gear 56x. A spacing friction washer 56b is preferably interposed. When shaft 22 turns, the reduction train from gear 47 by gears 50, 52 and 53, cause the master slow hand 58 to move at one-twentieth the rate of the master fast hand 48. The drawings likewise show a register device 34 driven by bevel gears 32, 33 from the shaft 31 of gear 30.

Figure 9:
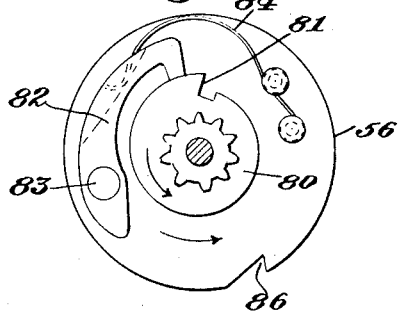
Figure 9 is a detail view, on a larger scale, of the stop cams in the master indicator.

The cam member 56 (Figures 1, 4 and 9) has a notch 86 in its periphery for engagement by the pivoted stop pawl 87 so that the cam and pawl operate as a zero stop device to limit the resetting movement of the cam 56 and thus of the master slow hand 48. Pawl 87 is held in engagement with the cam 56 by a spring 89. The cam member 80 is fixed on the sleeve of the spindle 45 adjacent the transfer gear 47 thereof, and has a shoulder 81 for engagement by the pawl 82 mounted by a pivot 83 on the cam member 56 (Figure 9), this pawl 82 being held in engagement by the spring 84. During driving, for indication, i. e., from the shaft 22, both the cam member 56 and the cam member 80 are turned in the direction of the arrows (Figure 9), the cam member travelling at twenty times the angular speed of the cam member 56, in the present example, and thus overrunning the pawl 82.

It is preferred (Figures 2 and 4) to provide a hair pin spring 61 to retard free movements of the master fast hand 48.

A gear 100 on a shaft 101, mounted in plates 24 and 28, is in mesh with the master fast hand gear 38a, and a corresponding gear 102 is in mesh with the master slow hand gear 56x, and is fixed on a shaft 103 likewise mounted in plates 24 and 28. These shafts project through plate 24, and each is provided with a head 105 having a kerf 107a therein which is traversed by a pin 107. The connecting shafts 108 are illustrated as being of flat stock adapted to closely fit the kerfs, and having end notches 109 for reception of the pins 107 whereby these pins prevent radial separating movement of the shaft 108 from the heads 105. Each shaft 108 is provided with a similar notch 109 at its opposite end for fitting into a corresponding head 106 also having a kerf 107a and a pin 107. The two heads 106 for the dummy indicator structure are mounted on shafts 101a, 103a which are provided with gears 100a, 102a of the same number of teeth as gears 100, 102. Gear 101a is in mesh with an idler gear 110 on a shaft 111 (Figures 2, 3 and 8) in the dummy indicator structure, this gear 111 in turn being in mesh with a gear 112 (Figures 2 and 3) fixed to a sleeve 113 which in turn is secured to the spindle 45a connected to the fast hand 48a in the dummy indicator. Likewise, gear 103a is in mesh with an idler gear 114 on a shaft 115, and the gear 114 in turn is in mesh with a gear 116 fixed to a sleeve 54a which is connected to the slow hand 58a of the dummy indicator.

By this arrangement, the slow hand 58a of the dummy travels in unison with the slow hand 58 of the master indicator, as there is no slip connection therebetween, but looseness in the motion may occur by reason of the gear connections and the universal mountings provided by the shafts 108 and pins 107. Likewise, the fast hand 48a of the dummy is connected similarly to the fast hand 48 of the master indicator. In both cases, however, the employment of idler gears 110, 114 in the corresponding connecting train causes opposite angular movements of the corresponding master and dummy hands, so that in the present example the hands will all move in a clockwise direction for indication, in the observer's view, and thus establish indications with respect to the dial 49 in the master indicator and a corresponding dial 49a in the dummy indicator.

Figure 10:
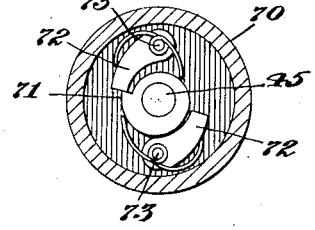
Figure 10 is a detail section, on a large scale, substantially on line 10—10 of Figure 2.

A knob 70 surrounding the spindle 45 of the master indicator extends through the glass G (Figure 2) which encloses the dial 49 of this master indicator, and is provided at its projecting end with a knurled portion 74 by which it may be rotated. Internally, the knob 70 has a cavity (Figure 10) in which are mounted the pins 73 arranged parallel to the axis of the spindle 45 and upon which are mounted the reset-driving pawls 72 which are spring pressed toward the spindle 45 which is provided opposite these pawls with a cam piece 71 having a shoulder. As this knob is turned in a clockwise direction (Figures 1 and 10), no action occurs, as the pawls 72 slip freely over cam 71. When the reset knob 70 is turned in a counterclockwise direction, however, a pawl 72 soon engages the shoulder of cam 71 and drives spindle 45 in a counterclockwise direction (Figure 1). This results in a resetting of the fast hand 48 in a counter-clockwise direction, the frictional engagement between gears 38 and 38a slipping to permit this resetting. At the same time, the interconnected gears 100, 100a are driven and the idler 110 operates upon gear 112 to correspondingly reset the fast hand 48a in the dummy indicator. Likewise, the gear 47 operates through the reduction train 50, 52, 53 to cause a slow return movement of the slow hand 58 in the master indicator. As the fast hand 48 continues in its counter-clockwise resetting movement, it drives therewith the cam member 80 (Figures 2 and 9) so that ultimately the shoulder 81 of this cam member encounters the pawl 82 mounted on the zero-limit cam 56 of the master slow hand, and a driving connection is established so that the resetting knob 70 now turns both the master fast hand 48 and the master slow hand 58 at the same angular speed until the notch 86 (Figures 1 and 9) encounters the limit pawl 87, and both hands of the master indicator are brought to a standstill in the zero position. This fast movement of the master slow hand during resetting is permitted by slippage between gears 53 and 56x; but, as the gear connection through interconnected gears 102, 102a is independent of this slippage, the two hands 48a, 58a of the dummy indicator likewise move back toward zero at the same angular speed, but in the opposite angular direction to hands 48 and 58.

Owing to the lost motion in the interconnecting train, however, these hands 48a and 58a of the dummy indicator usually lag behind the hands 48 and 58 of the master indicator, so that when the hands 48 and 58 have reached the zero stop they give an indication which is greater than zero.

To eliminate this divergence of the readings of the two indicators, and to eliminate the backlash existing so that the four hands will start from zero at the same instant, a backlash eliminator structure is provided in the dummy dial, in the present example. Separate backlash eliminator devices are provided for the fast and slow hands in the dummy indicator. Each of these devices comprises (Figures 2, 5, 6 and 8) an arm 120 having an angle piece 121 which is pivotally mounted in the plates 24a, 28a of the dummy indicator so that the arm 120 is free to rock. The sleeves 113, 54a are provided with cams 122, 123 which are fixed to the corresponding sleeves and hence turn with the sleeves and with the hands 48a, 58a. As shown in Figures 6 and 8, these cams are identical in shape and each has an abrupt shoulder 124 adjacent a cut-away portion 125 of the peripheral surface. It is preferred to provide each cam with an anti-friction roller 127 having a pivot 126 adjacent the shoulder. The arm 120 is preferably provided with a wear piece 128 having lateral sides forming a channel and engaging over both the cam 122 or 123 and its roller 127 (Figure 5). Springs 129 hold the wear pieces 128 against the corresponding cam and roller.

During the resetting operation, as hands 48a and 58a approach the zero position, the cams 122, 123 are turning in a clockwise direction (arrow, Figure 8), and the arms 120 and their shoes 128 are being held out by a maximum diameter of the cams 122, 123 close to the shoulders 124 thereof. As the hands pass, for example, the "1" position during resetting, the wear shoes 128 come to the shoulder on their corresponding cams 122, 123, and, owing to the cutting away of the cams 122, 123 at the portion 125 of the periphery, each spring actuated arm 120 will cause a movement of its cam 122 or 123 which is greater than its movement imparted through the corresponding connecting shaft 108. The rollers 127 operate to relieve friction between the cams and the wear shoes, and permit a rapid advancing movement. Thus the hands 48a and 58a are advanced in their resetting, and the backlash occurring in the connecting trains is absorbed. This advancing movement of the hands 48a, 58a continues until the backlash has been taken up, and the springs 129 now serve to cause the cams 122, 123 to continue in movement, in proportion to the further resetting movements of hands 48 and 58, until hands 48 and 58 are held at zero by the action of the zero limit pawl 87. Thus all backlash with respect to the later further movement in the indicating direction has been absorbed, and all hands read zero at the same time.

The two inner plates 24, 24a of the master and dummy indicators are illustrated as connected by a channel strap 140 having feet 141 turned angularly and bolted to these plates. This maintains the indicator structures at fixed distances, so that the shafts 108 can be mounted in the heads 105, 106 with freedom of movement, but without danger of separation.

It is obvious that many changes may be made in the arrangement and employment of the invention without departing from the scope of the appended claims.

I claim:

1. The combination in an indicating apparatus including a frame, a driven first member, an indicator member for indicating the movement of said first member, means for connecting said first and indicator members in driving relationship and having looseness of connection during movement in opposite directions, means also operating through said connecting means for returning said indicator member to initial position, of a rotatable cam member connected to said indicator member, said cam member having a cut-away portion, a roller eccentrically mounted on said cam member opposite one end of the cut-away portion, and a device mounted on said frame and engaging said cam member and roller and cooperating with said roller for moving said indicator member faster than the drive through said connecting means when said indicator member approaches a predetermined position for eliminating the effect of said looseness whereby the subsequent indicating movement of said indicator member from said first member is not affected by said looseness.

2. A device of the class described including a frame, a rotatable member, an indicator rigidly connected to said member, driving means for moving the said member in one direction to establish an indication and including a slip connection and connection means having backlash, means operating through said connection means for moving the member in the opposite direction for resetting the indicator to an initial position, said slip connection yielding to permit the movement in the opposite direction, a stop for limiting the movement of said resetting moving means, a device on the frame and cooperating means on the member for producing an increment of movement of said member during resetting at the end of the resetting movement when said resetting moving means approaches the stop, for eliminating backlash between said slip connection and indicator and restoring said indicator to its initial position when said resetting moving means is detained by said stop so that the indicator in its initial position is ready for immediate movement by said connection and driving means.

3. The combination in an indicating apparatus of a frame, a first indicator movable relative to said frame, a second indicator mounted back-to-back with said first indicator and also movable relative to said frame, driving means for moving said first indicator in one direction to establish an indication of the amount of movement of the driving means, means for moving the said first indicator in the opposite direction for setting to an initial position, a stop for limiting the setting movement of said first indicator, a gear train for connecting said first indicator to said second indicator whereby each said moving means will also operate to move said second indicator in a corresponding direction, and cooperative means including portions on said frame and second indicator for accelerating the movement of said second indicator for eliminating backlash in said gear train when the first indicator approaches said stop whereby to present both said indicators to initial position when said first indicator is limited by said stop and whereby both are positioned for being simultaneously and correspondingly driven by said driving means at the succeeding indicating operation, the portion of said means on the second indicator including means for holding the portion of said means which is on the frame against operative movement during the major portion of the movement to initial position.

4. In an indicating apparatus including a frame, a first movable indicator, a second movable indicator, driving means for moving said first indicator in one direction to establish an indication, means for moving the said first indicator in the opposite direction for setting to an initial position, a gear train for connecting said first indicator to said second indicator whereby each said moving means will also operate to move said second indicator in a corresponding direction, a rotatable cam member fixedly connected to said second indicator to be moved therewith, and a spring-actuated device on said frame cooperative with said rotatable member for advancing said second indicator and operating as the first indicator approaches the initial position during setting whereby to eliminate backlash in said gear train and to bring both indicators to initial position concurrently.

5. The combination in an indicating apparatus of a frame, a first indicator, a second indicator mounted back-to-back with said first indicator, driving means for moving said first indicator in one direction to establish an indication, means for moving said first indicator in the opposite direction for resetting to an initial position, a stop for limiting the movement of said first indicator in said opposite direction at a predetermined initial position, a direction-reversing gear train for connecting said first indicator to said second indicator whereby each said moving means will also operate to move said second indicator in a corresponding direction, said direction-reversing gear train being effective to cause the indicators to make their indicating movements in the same relative direction as viewed by an observer, said gear train having looseness between said indicators, a rotatable cam member connected to said second indicator to be moved therewith, and a spring-pressed arm on the frame engaged with said cam member and held thereby against operative movement during the major portion of the resetting movement, said arm cooperating with said rotatable cam member at the end of the resetting movement established by said train for effecting an increment of resetting movement of said second indicator beyond the position established by said train in resetting so that the indicators are concurrently positioned at initial position ready for simultaneous indicating movement from said driving means.

JAMES M. DAYTON.